US006466349B1

United States Patent
Valley et al.

(10) Patent No.: US 6,466,349 B1
(45) Date of Patent: Oct. 15, 2002

(54) INTEGRATED OPTICAL TRANSMITTER

(75) Inventors: George C. Valley, Los Angeles; Kenneth R. Elliott, Thousand Oaks; Alan R. Kost, Thousand Oaks; Daniel Yap, Thousand Oaks, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/078,992

(22) Filed: May 14, 1998

(51) Int. Cl.[7] .............................................. H04B 10/04
(52) U.S. Cl. ....................................................... 359/180
(58) Field of Search ................................. 359/159, 180, 359/188, 163; 385/88; 257/84

(56) References Cited

U.S. PATENT DOCUMENTS

| | | | | |
|---|---|---|---|---|
| 5,385,632 A | * | 1/1995 | Goossen ..................... | 156/306 |
| 5,479,544 A | * | 12/1995 | Ono et al. ..................... | 385/37 |
| 5,521,738 A | * | 5/1996 | Froberg et al. ............. | 359/184 |
| 5,608,561 A | * | 3/1997 | Marcuse et al. ............ | 359/161 |
| 5,611,008 A | * | 3/1997 | Yap ............................ | 385/14 |
| 5,621,560 A | * | 4/1997 | Wood .......................... | 359/161 |
| 5,706,116 A | * | 1/1998 | Sugata ........................ | 359/180 |
| 5,742,423 A | * | 4/1998 | Ido et al. ..................... | 359/254 |
| 5,774,614 A | * | 6/1998 | Gilliland et al. .............. | 385/88 |
| 5,818,984 A | * | 10/1998 | Ahmad et al. ................ | 385/14 |
| 5,870,512 A | * | 2/1999 | Koch et al. .................... | 385/14 |
| 5,883,996 A | * | 3/1999 | Knapp et al. ................. | 385/88 |
| 5,991,061 A | * | 11/1999 | Adams et al. ............... | 359/188 |
| 6,005,262 A | * | 12/1999 | Cunningham et al. ......... | 257/84 |
| 6,034,431 A | * | 3/2000 | Goosen et al. .............. | 257/750 |

OTHER PUBLICATIONS

Goossen et al., "GaAs MQW Modulators Integrated with Silicon CMOS", Apr. 1995, IEEE Photonics Technology Letters, vol. 7 No. 4, pp. 360–362.*

* cited by examiner

Primary Examiner—Leslie Pascal
Assistant Examiner—Dalzid Singh
(74) Attorney, Agent, or Firm—V. D. Duraiswamy; M. W. Sales

(57) ABSTRACT

An integrated optical transmitter includes a modulator drive circuit in communication with a modulator, and a laser drive circuit in communication with a laser. The modulator receives laser light from the laser and modulation control signals from the modulator drive circuit, and outputs modulated optical signals in a direction normal to the substrate surface. The transmitter is integrated by securing the laser to the modulator using flip chip technology. The laser includes a vertical cavity, and is optically aligned with the horizontal coupling surface of the modulator during the flip chip process.

28 Claims, 3 Drawing Sheets

INTEGRATED OPTICAL TRANSMITTER

BACKGROUND OF THE INVENTION (a) Field of the Invention

The present invention relates generally to optical transmitters for use in high data rate applications. More particularly, it relates to a design and structure for an integrated, laser-based solid state optical transmitter having high data rate capabilities.

(b) Description of Related Art

Fiber optics communications systems are used in a wide variety of applications. In general, fiber optics use a light source to generate and transmit data-carrying modulated light signals through a glass or plastic fiber to a detector. A particularly advantageous light source is a laser.

A known optical transmitter modulation scheme, generally referred to as direct modulation, uses a modulator to modulate directly the laser light source. In direct modulation, one applies an electrical current to the laser that varies with time and carries the digital data information. The current modulates the laser light so that the laser light output has the code of the digital information. However, direct modulation is generally limited by carrier and resonator dynamics (e.g., the device characteristics of the laser itself and the lasing process) to a maximum data rate of about 10–30 Gbps.

An alternative modulation scheme is an external modulation technique wherein the laser output is a constant, and a code is impressed on the laser output by passing it through or reflecting it from a modulator. Known external modulation techniques use edge-emitting lasers or horizontal-cavity lasers wherein the partially reflective mirrors are vertical, thereby creating an optical cavity that is horizontal, and a laser output that exits the laser in a horizontal direction. The edge-emitting laser may be used to feed an edge-coupled modulator in which light is coupled to the modulator at its edge. Light in the edge emitting laser and edge coupled modulator is typically confined in an optical waveguide. Thus, these types of lasers and modulators are also known as guided-wave devices.

Edge-emitting lasers generally involve a trade-off between device performance and the size of the laser output beam. In order to achieve a high quality edge-emitting laser, the size of the output beam is typically very small, e.g., about 1 micrometer in diameter. Thus, it is often difficult to couple efficiently the edge-emitting laser output, via an edge-coupled modulator, to an optical fiber, which is typically 8–10 micrometers in diameter. Accordingly, it is common for only 5–10% of the output laser light actually to go into the fiber unless an optical lens is placed between the modulator and fiber.

The above-described external modulation scheme may be implemented as a single structure in which the laser and the modulator are integrated on the same substrate. Such configurations typically use edge-emitting lasers and edge-coupled modulators (referred to herein as "horizontal-structure transmitters" S). However, in addition to the above-described general shortcomings associated with edge-emitting lasers and edge-coupled modulators, these horizontal-structure transmitters suffer from additional shortcomings. For example, the theoretical bandwidth of a horizontal-structure transmitter is limited because to obtain the depth of modulation required for digital communications, there are limits on how small one can make the length of the modulator. These size constraints also inhibit the ability of a designer to reduce the capacitance and the RC time constant of the modulator on the integrated structure. In general, the speed of the modulator is determined by the RC time constant, and the capacitance of the modulator is proportional to the area of the modulator which is the product of its length and width.

Edge-emitting lasers generally have relatively small cross-sectional areas which is the product of its width and height. The near-field image of the light emitted from such lasers typically is small (approximately one micrometer in size) and has an oblong shape. The characteristic is generally unfavorable for either free-space or optical fiber interconnection, and leads to higher insertion loss. Also, edge-emitting typically must be cleaved in order to create the vertical partially reflective mirrors, which can be incompatible with known semiconductor fabrication processes. The ability to implement horizontal-structure transmitters in an array requires many difficult processing steps. Such arrays generally are limited to one transverse direction. Finally, known horizontal-structure transmitters have shown data rates only up to about 40 Gbps.

Thus, there is a need for an optical transmitter that provides high output data rates (up to about 100 Gbps) without increasing cost and manufacturing complexity. There is a further need for an optical transmitter that can be easily constructed in arrays that even further speed up system throughput.

SUMMARY OF THE INVENTION

The present invention provides a design and structure for an optical transmitter that achieves high output data rates, while being easy and inexpensive to manufacture. The optical transmitter design of the present invention can be implemented in one and two dimensional arrays without the need for the many and difficult processing steps required to array known optical transmitters.

In a preferred embodiment of the invention, the optical transmitter includes a modulator drive circuit in communication with a modulator, and a laser drive circuit in communication with a laser. The transmitter achieves high output data rates (greater than 10 Gbps) by using an external modulation technique wherein the laser output is a constant, and a code is impressed on the laser output by passing it through a modulator. The modulator outputs modulated light based on laser light received from the laser and modulation control signals received from the modulator drive circuit.

As an example, the modulator drive circuit may be implemented with one or several heterojunction bipolar transistors (HBT), the modulator may be implemented as a surface-coupled, multiple-quantum-well (MQW) modulator, and the laser may be implemented as a vertical cavity surface emitting laser (VCSEL). In operation, incoming radio-frequency (RF) data signals are applied to and amplified by the HBT to drive the MQW modulator. The HBT and the MQW modulator are preferably grown on the same substrate to reduce stray capacitance and inductance. The MQW modulator is illuminated externally by the VCSEL, thereby generating high output optical data rates from the MQW modulator. The VCSEL is integrated and optically aligned with the MQW modulator using self-aligning, flip chip fabrication procedures to reduce optical loss.

Thus, key features of the present invention include using the flip chip process to integrate a surface-emitting VCSEL optically aligned over a surface-coupled modulator, and using mixed device technology to integrate the HBT and the modulator, preferably on the same substrate. The preferred flip-chip procedure includes self-aligning techniques to reduce coupling loss between the VCSEL and the modulator. Using a VCSEL on a separate substrate from the HBT is advantageous because the fastest HBTs have been grown on InP while VCSELs grown on InP have shown poor performance.

The optical cavity of the VCSEL is referred to as vertical because the cavity is parallel to the surface of the VCSEL substrate. Accordingly, the VCSEL light output is in a direction that facilitates its use with the surface-coupled MQW modulator. Thus, the surface-emitting VCSEL and the surface-coupled modulator output are available through the upper and lower horizontal surfaces, respectively, of the VCSEL and the MQW substrates. Modulated light is available from the lower horizontal surface of the transmitter as the output data signal. Constant light is available from the upper horizontal surface of the transmitter and can be used to monitor the average signal power. Having surface-access to the laser and modulator of the disclosed optical transmitter allows many such transmitters to be constructed in an array (one and two dimensional), thereby even further increasing throughput speed.

The present invention may be embodied in an integrated optical transmitter comprising: a drive circuit that receives input data signals and generates drive signals; a laser having a vertical cavity and a laser substrate; a modulator that receives said drive signals and laser light from said laser and generates a modulated optical output corresponding to said drive signals; said drive circuit and said modulator comprising solid state material and having a common substrate distinct from said laser substrate; said laser also comprising solid state material and integrated with said modulator by a flip-chip procedure. The drive circuit could include one or several heterojunction bipolar transistors, the laser could be implemented as a vertical cavity surface emitting laser, and the modulator could be implemented as a multiple quantum well modulator.

In a further embodiment, the flip chip procedure automatically optically aligns the laser with the modulator. The flip chip procedure preferably includes the use of solder bumps to secure the laser in place with respect to said modulator. The transmitter may further include a laser drive circuit also on said common substrate, along with contacts between the laser drive circuit and the solder bumps such that the solder bumps are part of an electrical path that passes laser drive signals from the laser drive circuit to the laser.

The present invention may also be embodied in a high data rate optical transmitter comprising: a modulator drive circuit that receives data input signals and generates modulator drive signals; a laser that has a vertical cavity; a modulator that receives said drive signals and laser light from said laser and generates a modulated optical output; said laser integrated with said modulator by a flip-chip procedure.

In a further embodiment, the flip chip procedure automatically optically aligns the laser with said modulator. The flip chip procedure preferably includes the use of solder bumps to secure the laser in place with respect to the modulator.

In a further embodiment of the above-described transmitter, the transmitter includes a laser drive circuit, along with contacts between the laser drive circuit and the solder bumps such that the solder bumps are part of an electrical path that passes laser drive signals from the laser drive circuit to the laser.

The present invention may also be embodied in a method of making an integrated transmitter comprising the steps of: providing a modulator drive circuit and a modulator in communication therewith; and integrating a laser with said modulator using a flip chip procedure, wherein said laser comprises a vertical cavity.

In a further embodiment of the above-described method, the flip chip procedure automatically optically aligns the laser with the modulator. The flip chip procedure preferably includes the use of solder bumps to secure the laser in place with respect to the modulator.

In an even further embodiment of the above-described method, the method further includes the steps of: providing a laser drive circuit; and providing contacts between the laser drive circuit and the solder bumps such that the solder bumps are part of an electrical path that passes laser drive signals from the laser drive circuit to the laser.

The invention itself, together with further objects and attendant advantages, will best be understood by reference to the following detailed description, taken in conjunction with the accompanying drawings.

DESCRIPTION OF THE PREFERRED EMBODIMENTS

By way of introduction, a general description of the invention and the disclosed embodiments thereof will now be provided. The present invention may be embodied in a design and structure for an optical transmitter that can be used in a high data rate fiber optics communication system. The disclosed transmitter may also be used in a fiber-less optical link wherein the optical transmitter communicates directly with an optical receiver without passing the light through a fiber. The disclosed transmitter may generate analog or digital signals, and can operate over a wide range of data rates (generally between 0.1 and 100 Gbps), while being easy and inexpensive to manufacture. In a preferred embodiment of the invention, the optical transmitter includes a modulator drive circuit in communication with a modulator, and a laser drive circuit in communication with a laser. The transmitter achieves high output data rates (e.g., above about 10 Gbps) by using an external modulation technique wherein the modulator outputs modulated light based on laser light received from the laser and modulation control signals received from the modulator drive circuit.

As an example, the modulator drive circuit may be implemented with one or several heterojunction bipolar transistors (HBT), the modulator may be implemented as a multiple quantum well (MQW) modulator, and the laser may be implemented as a vertical cavity surface emitting laser (VCSEL). In operation, incoming radio-frequency (RF) data signals are applied to and amplified by the HBT to drive the MQW modulator. The HBT and the MQW modulator are preferably grown on the same substrate to reduce stray capacitance and inductance. The MQW modulator is externally illuminated by the VCSEL, thereby generating high output optical data rates (greater than about 10 Gbps) from the MQW modulator. The VCSEL is integrated and optically aligned with the MQW modulator using self-aligning, flip chip fabrication procedures to reduce optical loss.

Thus, key features of the present invention include using the flip chip process to integrate a VCSEL with a modulator, and using mixed device technology to integrate the HBT and the modulator, preferably on the same substrate. The preferred flip chip procedure includes self-aligning techniques to reduce coupling loss between the VCSEL and the modulator. Using a VCSEL on a separate substrate from the HBT is advantageous because the fastest HBTs have been grown on InP while VCSELs grown on InP have shown poor performance.

Figure 1:
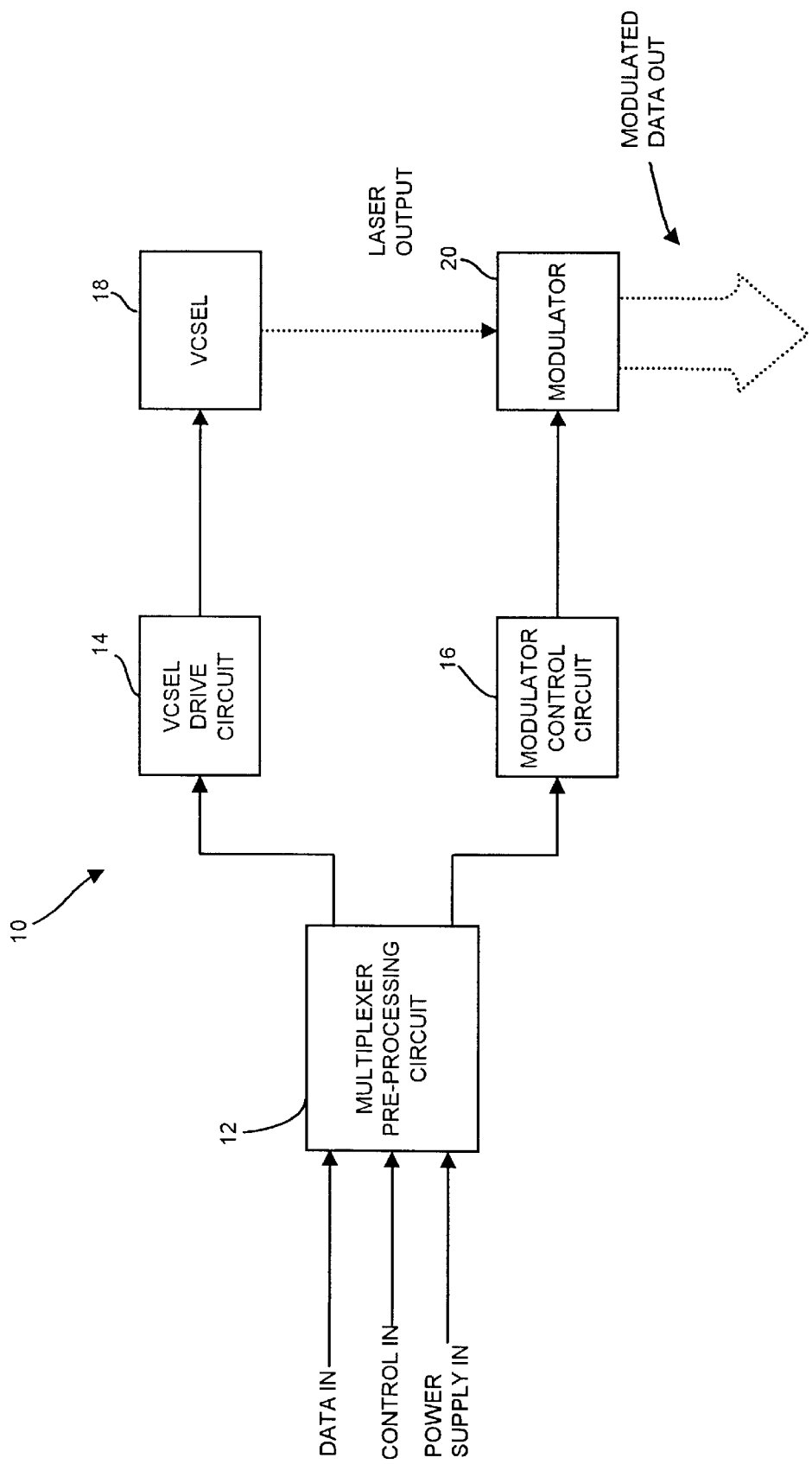
FIG. 1 is a block diagram illustrating the operation of an optical transmitter embodying the present invention.

Turning now to the figures, FIG. 1 is a block diagram illustrating the operation of a high speed optical transmitter 10 embodying the present invention. As shown, the optical transmitter 10 includes a multiplexer/signal-preprocessing-circuit 12 coupled to a laser driver circuit 14 and a modulator control circuit 16. The laser drive circuit 14 drives the laser 18, and the modulator control circuit 16 provides control voltages to the modulator 20. In operation, the multiplexer/pre-processor 12 receives a variety of inputs shown in FIG. 1 as DATA, CONTROLS, and POWER SUPPLY. The DATA may be received in a variety of formats, and the multiplexer/pre-processor places the input signals into an appropriate format for downstream components and routes the formatted data to the appropriate component. In the illustrated example, the immediate downstream components are the laser drive circuit 14 and the modulator control circuit 16. The laser 18 is driven by the drive circuit 14 to output unmodulated laser light to the modulator 20. The modulation scheme is external in that the laser output is not altered. Instead, the laser output is a constant, and a code is impressed on the laser output by passing it through a modulator.

Figure 2:
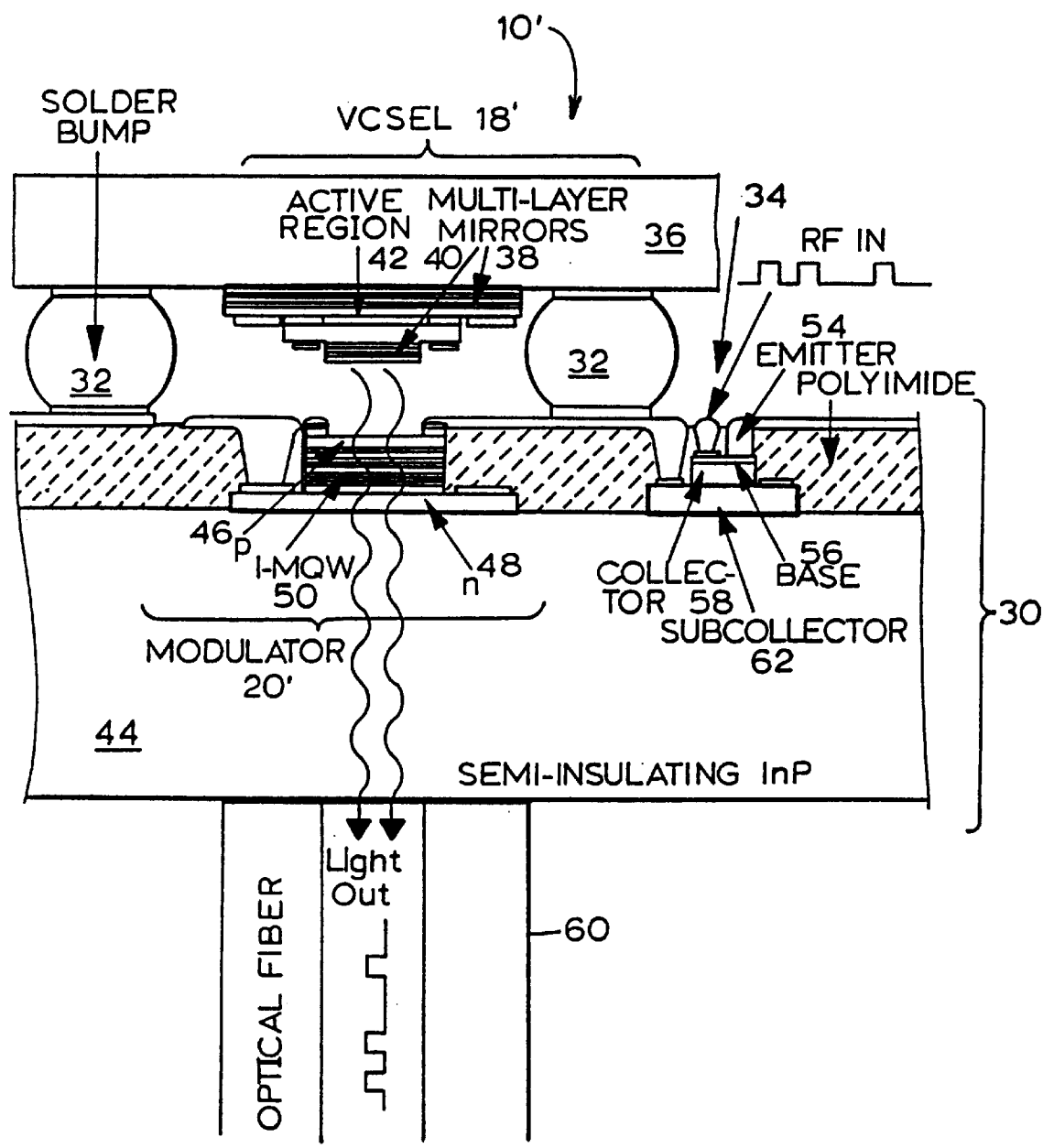
FIG. 2 is a diagram illustrating a structure and design of the optical transmitter shown in FIG. 1 and embodying the method and apparatus of the present invention.

FIG. 2 is a diagram illustrating an integrated optical transmitter 10' embodying the method and apparatus of the present invention. The integrated optical transmitter 10' illustrates a particular structure and design of the optical transmitter 10 shown in FIG. 1. The transmitter 10' includes a VCSEL 18' coupled to a base structure 30 by solder bumps 32 according to a self-aligning flip-chip procedure. The base structure 30 generally includes a MQW modulator 20' and a HBT transistor 34 fabricated according to mixed-device semiconductor fabrication techniques, which will be addressed in more detail later in this disclosure.

The VCSEL 18' shown in FIG. 2 is a known laser construction. As with all lasers, the VCSEL generates coherent light wherein the amplitude, polarization, frequency or wavelength, and phase of the output laser light can be controlled. The VCSEL 18' is shown mounted to the underlying base structure 30 which includes the MQW modulator 20'. In its mounted position, the VCSEL 18' is actually upside-down in comparison with its non-mounted position. The VCSEL 18' includes, inter alia, a supporting substrate 36, a first multi-layer mirror 38 on the substrate 36, a second multi-laser mirror 40, and an active region 42 between the first mirror 38 and the second mirror 40. The solder bumps 32 are attached during the flip-chip fabrication procedure, which will be addressed in more detail later in this disclosure. The solder bumps 32 provide physical support for the VCSEL 18', secure the VCSEL 18' in place with respect to the underlying base structure 30, automatically optically align the VCSEL 18' with the underlying modulator 20', and provide electrical contact between the VCSEL 18' and the laser drive circuits located on the base structure substrate 30.

For ease of illustration, only a single HBT 34 is shown in FIG. 2. However, it is understood the base structure substrate 30 includes various HBTs and other circuit components that combine to form the laser drive circuit 14, the modulator control circuit 16, and the multiplexer/pre-processing circuit 12 shown in FIG. 1.

In a conventional manner, the first and second mirrors 38, 40 define an optical cavity region which houses the active layer 42. The mirrors 38, 40 form an optical resonator that repeatedly reflects light in the cavity region back and forth between the mirrors 38, 40. The mirrors 38, 40 typically are partially reflective (i.e., both reflective and partially transparent) so that some light passes through the mirror. The active layer 42 generates light that is reflected between the mirrors 38, 40 and eventually output through the bottom mirror 40 to form the coherent laser output light. The active layer 42 may be a semiconductor material that is stimulated or pumped by feeding a large amount of dc current to a p/n junction in the active layer 42. The current is provided by the laser driving circuit 14 shown in FIG. 1. As a result of this current, a large number of electrons are injected in the conduction band at the junction while a large number of holes are injected in the valence band at the junction. When the electrons in the conduction band recombine with the holes in the valence band through the forbidden energy-band gap, photons are emitted. In a known manner, these emitted photons are reflected back and forth between the mirrors 38, 40, stimulate additional recombination of electrons and holes, and eventually resulting in a coherent laser light output.

The optical cavity of the VCSEL 18' is referred to as vertical because the mirrors 38, 40 that define the optical cavity are horizontal so that the cavity is parallel to the surface of the VCSEL substrate 36. Accordingly, the VCSEL 18' light output is in a direction that facilitates its use with the surface-coupled MQW modulator 20'. Thus, the VCSEL 18' and the modulator 20' output are available, respectively, through the upper and lower horizontal substrates 36, 44 of the integrated optical transmitter 10'. Having surface-access to the laser and modulator of the disclosed optical transmitter 10' allows many such transmitters to be constructed in an array (one and two dimensional), thereby even further increasing the throughput speed. The MQW modulator 20' is a vertically-accessed modulator, which is also referred to as surface-coupled or normal-incidence. The modulator 20' generally includes a top p-type semiconductor layer 46, a bottom n-type semiconductor layer 48 and an intrinsic layer (i-MQW) 50 between the top layer 46 and the bottom layer 50. The modulator substrate 44 (which is also the substrate of the base structure 30) transmits modulated laser light which may be coupled to an optical fiber 60. The wavelength of the modulated light is matched to the substrate material such that the modulator substrate 44 is transparent to the wavelength of the modulated output light that is to be coupled to the fiber. For example, if the substrate is InP, the absorption band edge of InP is around 900 nm. As long as the VCSEL 18' outputs light at a wavelength well above 900 nm, the modulated output from the modulator 20' will pass through the substrate 44 unabsorbed.

The modulator 18' operates by the modulator control circuit 16 (shown in FIG. 1, but represented in FIG. 2 by the single HBT 34) controlling the modulator 18' to impress the signal information to the modulator 18'. This is done by applying a voltage across the top and bottom layers 46, 48 of the modulator 18' and changing the voltage according to the desired modulation scheme. In general, a higher reverse-bias voltage allows the i-MQW layer 50 to absorb some portion of the light, while a lower voltage makes the i-MQW layer 50 partially transparent to let light through. The amount of voltage applied controls the fraction of light that is passed and/or absorbed by the i-MQW layer 50. Thus, the modulator 20' acts like a variable attenuator and can generate analog or digital coded output.

The light emitting region of the VCSEL 18' (which corresponds to the bottom mirror 40) is preferably round and so is the modulator 20'. The modulator size matches the core of a typical optical fiber 60 (typically 8–10 micrometers in diameter) to improve the coupling efficiency of the light from the modulator to the fiber. If the modulated light beam output from the modulator 20' is much smaller or larger than what is accepted by the fiber, much of the light is not coupled in. This is an important result of using a vertically-accessed VCSEL 18' mounted over a vertically-accessed modulator 20'. The size of the laser output for a vertically-emitting laser 18' can be easily made to match the size of the vertically-accessed modulator 20' which can be made to match the size of the optical fiber that receives the modulated output from the modulator 20'.

The HBT 34 shown in FIG. 2 is a standard npn bi-polar junction transistor having an emitter region 54, a base region 56, a collector region 58 and a sub-collector region 62. For ease of illustration, only the single HBT 34 is shown in FIG. 2. However, it is understood the base structure substrate 44 includes various HBTs and other circuit components that combine to form the laser drive circuit 14, the modulator control circuit 16, and the multiplexer/pre-processing circuit 12 shown in FIG. 1.

As previously noted, a flip-chip process using solder bumps is used to secure the VCSEL 18' to the base structure 30, and, more particularly, to the surface-coupled MQW modulator 20'. The surface tension of molten, reflowing solder bumps 32 is used to self-align the two chips together. For this flip-chip process, initial placement of the two chips can be done with an accuracy of 10–20 microns by using a conventional flip-chip aligner. However, the alignment accuracy achieved after reflow of the solder bumps 32 is 1–2 microns. Thus, the surface-emitting VCSEL 18' and surface-coupled modulator 20', which have diameters of 8–10 microns, can be aligned with high optical coupling efficiency by this low-cost method. Implementation of this assembly approach involves the fabrication of solder-compatible bonding pads on both the HBT/modulator (base structure 30) and the VCSEL chips. In addition to the pads, solder bumps, consisting of materials such as Pb/Sn, are formed on one of the chips. Note that these solder bumps and bonding pads can be located on the interconnect metalization of the chip. Besides performing the self-alignment function, the solder bumps 32 are used to electrically connect the two chips. Thus, the drive circuitry for the VCSEL 18' can be located on the HBT/modulator chip (i.e., base structure 30).

In operation, the light from the VCSEL 18' is transmitted through the modulator 20' and through the substrate 44 on which the modulator 20' is located. The modulator 20' should have a material (or epitaxial layer) structure that is compatible with this function. Thus, both the p layer and the n layer of the modulator 20' should consist of materials that are transparent to the wavelength of the light emitted by VCSEL 18'. Also, the substrate materials 44 should be transparent. For example, if the VCSEL 18' wavelength is 1300 nm or 1550 nm and if the modulator 20' and HBT 34 are fabricated on an InP substrate 44, suitable materials for those layers are AlInAs and InP, respectively. The MQW 50 region of the modulator 20' could, for example, consist of alternating layers of GaInAsP (type A) and GaInAsP (type B). The type A GaInAsP layer is the quantum well and has an excitation peak that is located at a slightly higher energy (shorter wavelength) than the VCSEL emission. The type B GaInAsP layer is the barrier and has a bandgap such that the barrier is transparent to the VCSEL emission. As with other MQW electro-absorption modulators, application of a reverse-bias voltage across the p-i(MQW)-n diode 50 (which actually performs the modulation) shifts the optical absorption characteristics of the MQW structure and produces a voltage dependent absorption. The modulator 20' can also contain a highly p-doped contact layer (not shown) that is located above the p layer. That contact layer facilitates the formation of a low-resistance electrical contact. The contact layer is preferably removed from the area of the modulator 20' through which the light from the VCSEL passes. The detailed composition of the surface-coupled modulator can be optimized to a particular application, based on the performance factors discussed later in this disclosure.

The base structure substrate 44 of the transmitter 10' contains the modulator 20' plus the electrical drive circuitry for both the VCSEL 18' and the modulator 20'. The electrical circuitry consists of multiple HBTs as well as other electrical components such as inter-connection lines, resistors and capacitors. Thus, the base structure 30 must contain the dissimilar epitaxial layers of both the modulator 20' and the HBT 34. The epitaxial layer structures of both the modulator 20' and the HBT 34 are deposited onto the same substrate 44 by means of known epitaxial growth techniques such as molecular beam epitaxy (MBE) or metal-organic chemical vapor deposition (MOCVD). As shown in FIG. 2, the substrate 44 contains areas of either modulator epitaxial layers or HBT epitaxial layers. These areas are located side-by-side and both are located on top of the InP substrate 44.

One approach to forming these structures is described next. First, the epitaxial layers (epi-layers) for the modulator are deposited on a bare, planar InP wafer by MBE or MOCVD. Next, a film of dielectric material such as silicon dioxide is deposited above the modulator epi-layers. The silicon dioxide is patterned and areas of it are removed by using common photo lithographic and etching techniques. The areas of removed silicon oxide define those areas which will contain HBT epi-layers. The silicon dioxide pattern serves as a mask in the subsequent processing step in which the modulator epi-layers are etched away from the exposed areas. The etching is continued until the InP substrate is reached. Next, the HBT epi-layers are deposited by MBE or MOCVD. HBT epi-layers of high quality are deposited in the etched trenches. There also may be some material deposited on top of the silicon dioxide (above those areas in which the modulator epi-layers are present). That excess material is removed after first protecting the HBT material in the formerly trenched areas. Finally, the silicon dioxide film is removed. The resulting wafer has an approximately flat surface with areas of high-quality modulator epi-layers and areas of high-quality HBT epi-layers. The co-planarity of the tops of the modulator 20' and HBT 34 areas can be achieved by adjusting the thicknesses of the n layer of the modulator and of the subcollector 62 of the HBT. This monolithic, mixed-device substrate is then processed to form the integrated modulator-HBT circuits.

Figure 3:
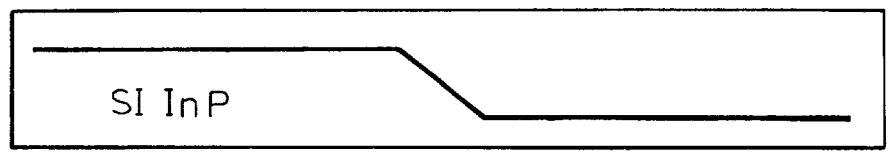
FIGS. 3–6 illustrate a fabrication technique for forming the base structure (modulator and HBT) of the transmitter shown in FIG. 2.
Figure 4:
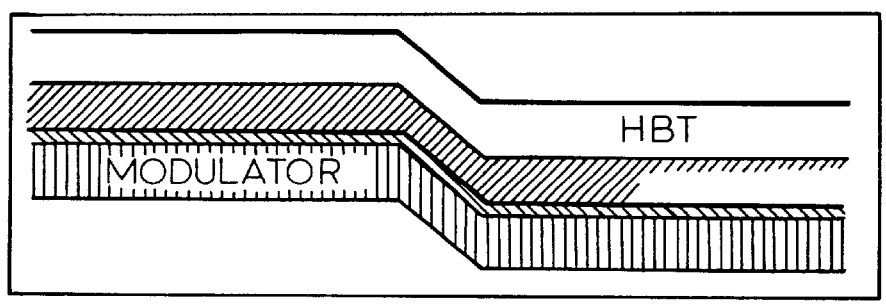
Figure 5:
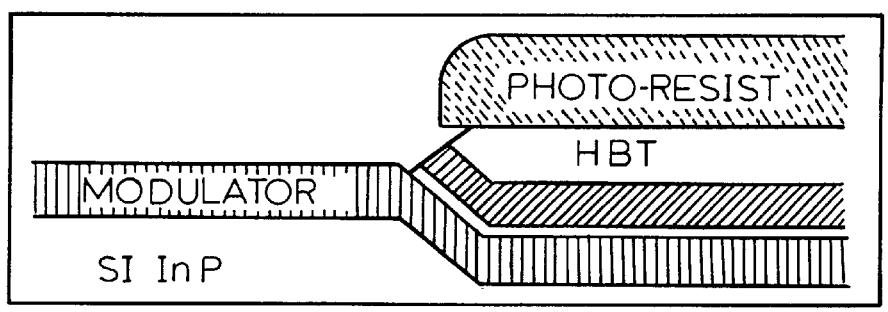
Figure 6:
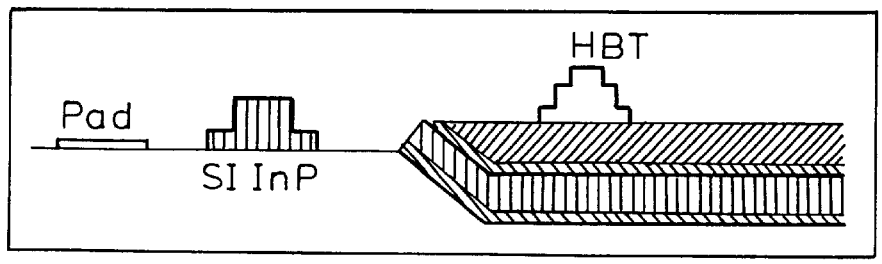

The above-described approach to forming the integrated modulator-HBT substrate is illustrated in FIGS. 3–6. According to this approach, a pattern of trenches is first etched into an InP substrate (FIG. 3). These trenched areas define the locations in which the HBT circuits will be formed. The un-etched areas define the locations of the modulators. The etched, patterned substrate is then placed in an epi-layer growth system. Both the epi-layers for the modulators and for the HBT are grown in a single run. The modulator epi-layers are grown first, followed by the growth of an electrical-isolation (semi-insulating) buffer layer and then by growth of the HBT epi-layers (FIG. 4). A preferred growth method is MBE. After the growth run, the areas of epi-layer that are located in the trenches are protected and the HBT epi-layers and buffer layer are removed from the unprotected areas, to expose the modulator epi-layers (FIG. 5). The resulting wafer, like in the first approach, has an approximately flat surface with areas of high-quality modulator epi-layers on top and other areas of high-quality HBT epi-layers on top. The co-planarity of the tops of the modulator and HBT areas can be achieved by adjusting the depth of the initial trenches. The modulator and HBT circuits are then fabricated (FIG. 6). Still other approaches for forming the mixed-device base structure are possible.

There are three factors that must be optimized to make a device that is suitable for ultra-high speed electrical-to-optical data encoding in a digital system: bandwidth, depth of modulation, and optical loss. In the disclosed optical transmitter 10', a semiconductor multiple-quantum-well (MQW) optical modulator 20' is grown on the same chip as the heterojunction bipolar transistor (HBT) 34 used to drive it to minimize interconnection parasitics; and this device is in turn integrated by the flip chip process with a vertical cavity surface emitting laser (VCSEL) 18' whose beam propagates through the MQW modulator 20' as shown in FIG. 2. The advantages of this approach are very high potential bandwidth limited by the capacitance of the modulator, good potential depth of modulation due to optimized MQW electro-absorption, and low insertion loss due to the physical closeness and matched areas and shapes of the modulator, the VCSEL, and the optical-fiber core.

It can be seen from the foregoing detailed description that the disclosed invention provides several advantages. For example, the integrated transmitter is actually a small optoelectronic circuit chip (the base substrate) that resembles other electronic circuit chips. The transmitter chip has an even smaller chip, the VCSEL, that is mounted on it. The VCSEL chip adds approximately 0.01–0.50 mm to the overall thickness of the transmitter. All external electrical connections (even ones for the VCSEL) are made through the base substrate. Thus, the integrated transmitter, although composed of two separate chips, is treated from an electrical interconnection and packaging viewpoint as if it were a single chip.

The modulated optical signal is emitted through the back side (lower surface) of the base substrate. The light is emitted approximately normal to the lower surface of the substrate. Thus, various known techniques for optical coupling to/from the back side of chips can be used for coupling light from the transmitter. Since the transmitter can have an overall thickness which is approximately the same as that of a conventional electronic chip, the integrated transmitter can itself be flip-chip mounted on another carrier in accordance with known packaging methods. Such methods are commonly used to package back-side illuminated photodetectors and back-side emitting VCSELs.

The primary electrical connections are made to and by means of the "inside" surfaces of the VCSEL and the base substrate (i.e., those surfaces facing the VCSEL and HBT). This requires VCSELs to have both anode and cathode connections available on the epi-layer side. Likewise, the modulator and HBT circuits also have their primary electrical connections made through the epi-layer side.

The modulator modulates the optical transmission through it. The light from the VCSEL passes through in a direction which is approximately normal to the epi-layers of the modulator. There are particular aspects of the modulator design and the base substrate (e.g., which layers are optically transparent and which can be optically absorbing, as described above) that make possible this mode of optical modulation.

Electrical isolation between various modulators and HBTs on the base substrate can be achieved by means of having semi-insulating material located underneath (i.e, the substrate side) the epi-layers of the devices. This semi-insulating material can be a semi-insulating substrate (e.g., the semi-insulating InP substrate) or a grown semi-insulating, layer (e.g., the electrical-isolation buffer of the second approach for material integration).

Although both the modulator and the HBT are integrated monolithically (with their epi-layers grown on the same substrate), the two devices have different and separate epi-layer structures. Thus, the epi-layer designs of both devices can be optimized separately, according to their different functions.

Circuit and device fabrication is based on known integrated-circuit processing methods. Known methods for fabricating HBT circuits can be modified to also fabricate modulators. Some of the processing steps can be used jointly to fabricate both the modulator and the HBT. These steps include those for making electrical contacts to certain layers, those for forming interconnection metalization, those for surface planarization, and those for device passivation.

The modulator and HBT are approximately co-planar. This permits the fabrication of the modulator and HBT circuits to be done more easily (since the surface features created when defining individual modulator and HBT devices are not as deep). Also, the co-planarity of the those devices permits their joint processing.

Arrays of multiple transmitters can be formed on a single base substrate or from multiple base substrates (which are then mounted on another carrier). When a single base substrate is used, the multiple VCSELs could consist of multiple VCSEL chips or a single VCSEL substrate containing multiple VCSELs. Those VCSELs would be integrated by a flip-chip procedure.

Of course, it should be understood that a range of changes and modifications can be made to the preferred embodiment described above. For example, the present invention is described in connection with a particular hardware (such as MQW modulation and HBT) and processing structure (such as the mixed-device substrate and fabrication methods) for optically transmitting and receiving information. However, a wide variety of transmitting and receiving structures could be utilized as long as the essential features described herein are present. It is therefore intended that the foregoing detailed description be regarded as illustrative rather than limiting and that it be understood that it is the following claims, including all equivalents, which are intended to define the scope of this invention.

What is claimed is:

1. An integrated optical transmitter comprising:
   a drive circuit that receives data input signals and generates drive signals;
   a laser having a vertical cavity and a laser substrate;
   a modulator that receives said drive signals and laser light from said laser and generates a modulated optical output corresponding to said drive signals;
   said drive circuit and said modulator comprising solid state material and having a common substrate distinct from said laser substrate;

said laser also comprising solid state material and integrated with said modulator by a flip-chip procedure to align said modulator and said laser.

2. The transmitter of claim 1 wherein said drive circuit comprises a one or more heterojunction bipolar transistors.

3. The transmitter of claim 1 wherein said laser comprises a vertical cavity surface emitting laser.

4. The transmitter of claim 1 wherein said modulator comprises a surface-coupled modulator.

5. The transmitter of claim 1 wherein said optical output is generated at a rate grater than about 10 Gbps.

6. The transmitter of claim 1 wherein said flip chip procedure automatically optically aligns said laser with said modulator.

7. The transmitter of claim 1 wherein said flip chip procedure includes the use of solder bumps to secure the laser in place with respect to said modulator.

8. The transmitter of claim 7 further comprising:

a laser drive circuit also on said common substrate; and contacts between said laser drive circuit and said solder bumps such that said solder bumps are part of an electrical path that passes laser drive signals from said laser drive circuit to said laser.

9. A high data rate optical transmitter comprising:

a drive circuit comprising a solid state transistor that receives radio-frequency (rf) input signals and generates amplified rf signals;

a solid state surface-emitting laser having a vertical cavity;

a solid state surface-coupled modulator that receives said amplified rf signals and laser light from said laser and generates a modulated optical output;

said drive circuit and said solid state modulator having a common substrate; and said solid state laser intergrated with said modulator by a flip-chip procedure that mounts said laser over said modulator to align said modulator and said laser.

10. The transmitter of claim 9 wherein said transistor comprises one or more heterojunction bipolar transistors.

11. The transmitter of claim 9 wherein said laser comprises a vertical cavity surface emitting laser.

12. The transmitter of claim 9 wherein said modulator comprises a multiple quantum well modulator.

13. The transmitter of claim 9 wherein said optical output is generated at a rate greater than about 10 Gbps.

14. The transmitter of claim 9 wherein said flip chip procedure automatically optically aligns said laser with said modulator.

15. The transmitter of claim 9 wherein said flip chip procedure includes the use of solder bumps to secure the laser in place with respect to said modulator.

16. The transmitter of claim 15 further comprising:

a laser drive circuit also on said common substrate; and contacts between said laser drive circuit and said solder bumps such that said solder bumps are part of an electrical path that passes laser drive signals from said laser drive circuit to said laser.

17. The transmitter of claim 9 wherein:

said amplifier comprises a heterojunction bipolar transistor;

said laser comprises a vertical cavity surface emitting laser; and said modulator comprises a multiple quantum well modulator.

18. A high data rate optical transmitter comprising:

a modulator drive circuit that receives data input signals and generates modulator drive signals;

a laser that having a vertical cavity;

a modulator that receives said drive signals and laser light from said laser and generates a modulated optical output; and said laser intergrated with said modulator by a flip-chip procedure to align said modulator and said laser.

19. The transmitter of claim 18 wherein said flip chip procedure automatically optically aligns said laser with said modulator.

20. The transmitter of claim 18 wherein said flip chip procedure includes the use of solder bumps to secure the laser in place with respect to said modulator.

21. The transmitter of claim 20 further comprising:

a laser drive circuit; and contacts between said laser drive circuit and said solder bumps such that said solder bumps are part of an electrical path that passes laser drive signals from said laser drive circuit to said laser.

22. A method of making an intergrated transmitter comprising the steps of:

providing a modulator drive circuit and a modulator in communication therewith; and intergrating a laser with said modulator using a flip chip procedure to align said modulator and said laser, wherein said laser comprises a vertical cavity;

wherein said modulator drive circuit and said modulator have a common substrate.

23. The method of claim 22 wherein said flip chip procedure automatically optically aligns said laser with said modulator.

24. The method of claim 22 wherein said flip chip procedure includes the use of solder bumps to secure the laser in place with respect to said modulator.

25. The method of claim 24 further comprising the steps of:

providing a laser drive circuit; and providing contacts between said laser drive circuit and said solder bumps such that said solder bumps are part of an electrical path that passes laser drive signals from said laser drive circuit to said laser.

26. The method of claim 25 wherein said laser is integrated with said modulator such that said laser is separate from said modulator.

27. The method of claim 22 wherein:

said modulator drive circuit comprises a heterojunction bipolar transistor;

said laser comprises a vertical cavity surface emitting laser; and said modulator comprises a multiple quantum well modulator.

28. The method of claim 22 wherein said modulator generates an optical output at a rate greater than about 10 Gbps.

* * * * *